May 6, 1958                J. CIRONE                2,833,576

CONNECTING MEANS FOR A MIXER AND A DISPOSABLE MIXING BLADE

Filed Nov. 15, 1955                                       2 Sheets—Sheet 1

Joseph Cirone
INVENTOR.

BY *Clarence A. O'Brien*
*and Harvey B. Jacobson*
Attorneys

May 6, 1958             J. CIRONE             2,833,576
CONNECTING MEANS FOR A MIXER AND A DISPOSABLE MIXING BLADE
Filed Nov. 15, 1955             2 Sheets-Sheet 2
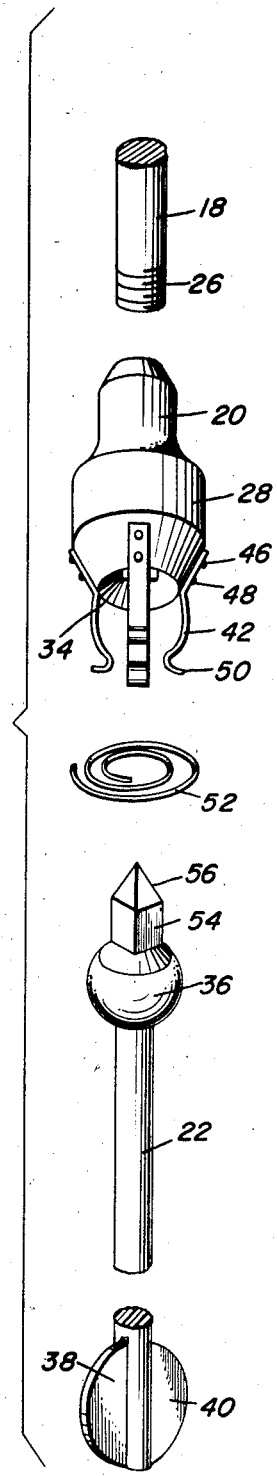
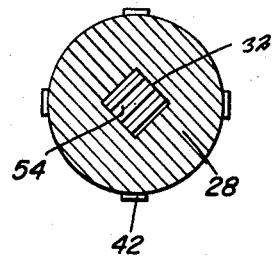
Fig. 4
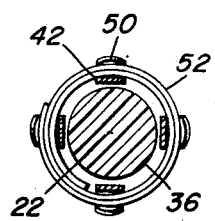
Fig. 5
Joseph Cirone
        INVENTOR.
BY

United States Patent Office 2,833,576
Patented May 6, 1958

2,833,576

CONNECTING MEANS FOR A MIXER AND A DISPOSABLE MIXING BLADE

Joseph Cirone, Ridgefield, N. J.

Application November 15, 1955, Serial No. 546,973

2 Claims. (Cl. 287—126)

This invention relates to a mixing and blending apparatus such as is conventionally used for mixing milk-shakes, malted milk and other similar beverages as are commonly used in restaurants, drug stores, and other eating establishments and has for its primary object the provision of a mixing machine employing a disposable mixing blade thereby enabling the prevention of the formation of harmful bacteria on mixing blades which are often used and reused, sometimes without cleaning.

A further object of the invention resides in the provision of means for detachably securing to the drive shaft of a mixing apparatus a disposable mixing blade which may be formed of any convenient material such as a synthetic plastic resin or the like.

The construction of this invention features the combination with a disposable mixing blade of a connector head having a plurality of fingers for engaging a spherical retainer portion of the mixing blade to hold the mixing blade detachably in position whereby the mixing blade may be rapidly and easily detached and discarded after a single use thus preventing the bacteria from multiplying on the mixing blade as in a conventional malted milk mixing apparatus which mixing blades are often left unwashed even overnight.

Still further objects and features of this invention reside in the provision of a disposable mixing blade that is simple in construction, which is capable of being easily molded in any conventional molding machine utilizing well known processes, which is inexpensive and which may be enclosed in a sanitary package to prevent the accumulation of germs and bacteria thereon.

These, together with the various ancillary objects and features of the invention which will become apparent as the following description proceeds, are attained by this disposable mixing blade and mixing apparatus, a preferred embodiment of which has been illustrated in the accompanying drawings, by way of example only, wherein:

Figure 3 is an exploded perspective view of portions of the apparatus comprising the present invention illustrating in particular the construction of the upper end of the disposable mixing blade and of the connecting head which is secured on the drive shaft and adapted to have the disposable mixing blade detachably secured thereto;

Figure 4 is an enlarged horizontal sectional view as taken along the plane of line 4—4 in Figure 2; and Figure 5 is a horizontal sectional view on an enlarged scale as taken along the line 5—5 of Figure 2 illustrating in particular the construction of the resilient means holding the fingers in engagement with the retainer portion of the disposable mixing blade.

Figure 1:
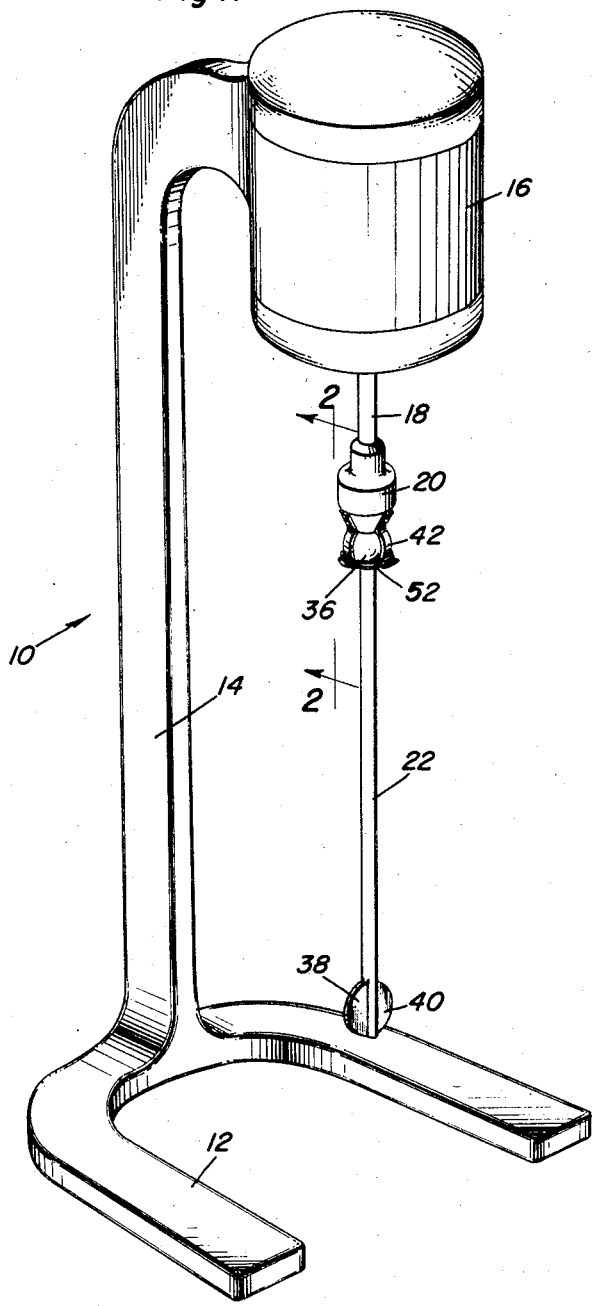
Figure 1 is a perspective view of the mixing apparatus employing the disposable mixing blade.
Figure 2:
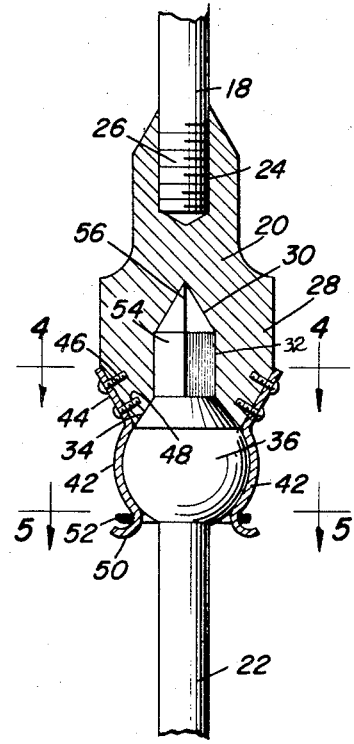
Figure 2 is an enlarged vertical sectional detail view as taken along the plane of line 2—2 of Figure 1.

With continuing reference to the accompanying drawings wherein like reference numerals designate similar parts throughout the various views, reference numeral 10 generally designates a mixing apparatus constructed in accordance with the concepts of the present invention which includes a base 12 which may be of U-shape as shown and generally conventional in mixing apparatus of this character and which has an upwardly extending stand 14 carrying a motor within a casing 16 for driving the drive shaft 18.

This invention in lieu of utilizing the drive shaft 18 with a blade at the end thereof as a permanent mixing structure employs a connecting head 20 which detachably holds a disposable mixing blade 22 for rotation with the drive shaft 18 upon operation of the motor within the casing 16.

The connecting head 20 is internally threaded as at 24 so as to be threadedly secured on the threaded end 26 of the drive shaft 18. The connecting head 20 has an enlarged portion 28 provided with a socket including a pyramid shaped cavity 30 opening into a square shaped recess 32 which communicates with an enlarged opening 34 for receiving the generally spherical shaped retainer portion 36 of the disposable mixing blade 22. The disposable mixing blade 22 is formed from any suitable material, preferably plastic such as polystyrene or the like which is easily molded or otherwise shaped as desired. The disposable mixing blade 22 has blade portions as at 38 and 40 at the lower end thereof.

A plurality of fingers 42 are provided with upper end portions 44 secured as by screw type fasteners 46 and 48 to the connecting head 20. These fingers have arcuate central portions adapted to embrace the spherical retaining portion 36 and terminate in lower hook portions 50. A suitable spring 52 is adapted to be placed on the hook portions 50 to resiliently hold the fingers in engagement with the spherical retainer portion 36 unless there is sufficient pressure applied on the blade 22 in a downward direction.

The upper end of the blade 22 is provided with an end portion 54 which is shown as being of a square cross sectional shape but which may be of any regular polygonal shape as to fit within the recess 32. The end of the blade 22 terminates in a pyramidal shaped portion 56 which facilitates insertion of the mixing blade between the hook-like end portions 50 of the fingers 42.

In use, the blade 22 may be easily inserted by an upward movement between the fingers 42 after the blade has been removed from its sanitary package. Then, immediately after a single use, the blade may be readily removed and destroyed thus preventing the accumulation of bacteria and harmful germs on the blade as is the case where the blade is used for mixing successive beverages.

The foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention as claimed.

What is claimed as new is as follows:

1. A device for connecting a drive shaft to a driven shaft, an end of said driven shaft being of a regular polygonal cross sectional shape and having an enlarged retainer portion closely spaced from said end of said shaft, said device comprising a connecting head, said connecting head having a socket receiving said end of said driven shaft, and means detachably securing said driven shaft to said connecting head, said means including fingers mounted on said connecting head resiliently engaging said retainer portion.

2. A device for connecting a drive shaft to a driven shaft, an end of said driven shaft being of a regular polygonal cross sectional shape and having an enlarged retainer portion closely spaced from said end of said shaft, said drive comprising a connecting head, said connecting head having a socket receiving said end of said driven shaft, and means detachably securing said driven shaft to said connecting head, said means including fingers mounted on said connecting head, and a spring engaging said fingers urging said fingers into resilient engagement with said spherical retainer portion.

References Cited in the file of this patent

UNITED STATES PATENTS

| | | |
|---|---|---|
| 1,166,568 | Wilton | Jan. 4, 1916 |
| 1,669,689 | Blish et al. | May 15, 1928 |
| 1,982,008 | Mandl et al. | Nov. 27, 1934 |
| 2,142,290 | Slocum | Jan. 3, 1939 |